(12) United States Patent
Ciaramella et al.

(10) Patent No.: US 8,457,491 B2
(45) Date of Patent: Jun. 4, 2013

(54) ALLOCATION OF TRANSMISSION POWER IN AN OPTICAL COMMUNICATION SYSTEM

(75) Inventors: Ernesto Ciaramella, Pisa (IT); Fabio Cavaliere, Pisa (IT); Giancarlo Gaimari, Genoa (IT); Emma Matarazzo, Pisa (IT); Stefano Brugioni, Pisa (IT); Luca Giorgi, Pisa (IT)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 325 days.

(21) Appl. No.: 12/741,721

(22) PCT Filed: Nov. 6, 2007

(86) PCT No.: PCT/EP2007/061930
§ 371 (c)(1),
(2), (4) Date: Sep. 9, 2010

(87) PCT Pub. No.: WO2009/059635
PCT Pub. Date: May 14, 2009

(65) Prior Publication Data
US 2011/0038627 A1    Feb. 17, 2011

(51) Int. Cl.
*H04J 14/00* (2006.01)
*H04B 17/00* (2006.01)
*H04W 52/32* (2009.01)

(52) U.S. Cl.
CPC ......... *H04B 17/0042* (2013.01); *H04W 52/327* (2013.01); *H04W 52/322* (2013.01)
USPC .......................................................... 398/57

(58) Field of Classification Search
CPC .................................................. H04J 14/0221
USPC .................. 398/34, 27, 162, 147, 38, 83, 94, 398/24, 9, 1, 57; 385/24
See application file for complete search history.

(56) References Cited

U.S. PATENT DOCUMENTS

| | | | |
|---|---|---|---|
| 6,871,020 B1 * | 3/2005 | Boroditsky et al. | 398/38 |
| 7,587,203 B2 * | 9/2009 | Shahidi et al. | 455/423 |
| 7,945,161 B2 * | 5/2011 | Ciaramella et al. | 398/34 |
| 2002/0154359 A1 | 10/2002 | Tsuda et al. | |
| 2004/0028407 A1 * | 2/2004 | Noheji | 398/59 |
| 2004/0037569 A1 * | 2/2004 | Kamalov et al. | 398/162 |
| 2007/0086332 A1 * | 4/2007 | Way et al. | 370/223 |

FOREIGN PATENT DOCUMENTS

WO    WO 2004/114567    12/2004

OTHER PUBLICATIONS

International Search Report for PCT/EP2007/061930, mailed Nov. 6, 2007.
Written Opinion of the International Searching Authority for PCT/EP2007/061930, mailed Nov. 6, 2007.

(Continued)

*Primary Examiner* — Danny Leung
(74) *Attorney, Agent, or Firm* — Nixon & Vanderhye P.C.

(57) ABSTRACT

Methods and apparatus for determining transmission power of a plurality of optical channels for transmission of the channels along respective paths obtained through an optical transmission system. Information is obtained indicative of the path of each channel through the optical transmission system, and each channel is allocated to a group of channels in dependence upon the obtained information. A quality metric is determined for each group of channels, and a total transmission power for each group is determined in dependence upon the determined quality metric.

20 Claims, 7 Drawing Sheets

OTHER PUBLICATIONS

Ciaramella E. et al., "A highly effective technique for setting the power preemphasis in WDM optical systems", Journal of Lightwave Technology, vol. 24, No. 1, (Jan. 2006), pp. 342-356.

Bullock, P. et al. ,"Optimizing wavelength grouping granularity for optical add-drop network architectures", Optical Fiber Communication Conference, Vol. TOPS, vol. 86, (Mar. 23, 2003), pp. 355-357.

* cited by examiner

ALLOCATION OF TRANSMISSION POWER IN AN OPTICAL COMMUNICATION SYSTEM This application is the U.S. national phase of International Application No. PCT/EP2007/061930 filed 6 Nov. 2007, the entire contents of which is hereby incorporated by reference.

TECHNICAL FIELD

The technology relates to methods and apparatus for allocating the transmission power of optical channels, for transmission of said channels within an optical communication system. Embodiments are particularly suitable for, but not limited to, allocation of optical channel power within Wavelength Division Multiplexed (WDM) optical networks.

BACKGROUND

Wavelength division multiplexing is the transmission of several different signals via a single optical fibre, by sending each signal ("channel") at a different optical frequency or wavelength. A multiplexer is used to combine the different channels together for transmission, and a demultiplexer is used to separate the channels following the transmission.

WDM optical transmission systems are typically composed of a number of spans of optical fibre, and include a variety of network elements such as terminals, line amplifiers, and add/drop nodes.

It is known that it is desirable to control the power levels of each of the channels in a WDM system. Optical signals experience wavelength dependent effects as they are transmitted between network nodes. Examples of wavelength dependent effects include fibre attenuation, Raman scattering within the optical fibre, optical amplifier wavelength dependent gain, chromatic dispersion slope, and variation in the uniformity of optical filters.

Due to the wavelength dependent effects, each channel will experience different impairments during transmission, potentially leading to each channel having a different bit-error rate (BER). The BER expresses the percentage of bits received in error, for example by an optical receiver, as compared to the total number of bits received. Another metric for measuring the quality of an optical channel is the Optical Signal to Noise Ratio (OSNR).

To offset the different propagation impairments experienced by the different channels, it is known to control the power of each channel. For example, it is known to use channel power pre-emphasis to control the transmission power of each channel, for offsetting the propagation impairments likely to be experienced by each channel as all of the channels are transmitted from a transmitter to a receiver over a single, linear link.

A variety of channel power pre-emphasis techniques are known, with different techniques often using different quality metrics to determine the channel transmission powers. As for instance described in U.S. patent application Ser. No. 11/572, 549, power pre-emphasis techniques can be based upon equalisation of the OSNR, or the BER.

SUMMARY

It is an aim of example embodiments to provide a method of allocating transmission power in an optical communication system that substantially addresses one or more problems of the prior art, whether referred to herein or otherwise. It is an aim of particular embodiments to provide a method of allocating transmission power that is suitable for use in systems in which channels are being transmitted along different paths.

A method determines transmission power of a plurality of optical channels for transmission of the channels along respective paths through an optical transmission system. The method comprises: obtaining information indicative of the path of each channel through the optical transmission system, and allocating each channel to a group of channels in dependence upon the obtained information. A quality metric is determined for each group of channels, and a total transmission power determined for each group in dependence upon the determined quality metric.

The present inventors have realised that known channel power allocation techniques applicable to point-to-point links are inappropriate for use in links with intermediate OADM (Optical and Drop Multiplexed) nodes, or to networks with a meshed topology. In particular, such known techniques assume that all channels are entered and terminated at the same nodes and therefore that each channel experiences similar propagation impairments. Hence such known techniques may provide poor performance if channels experience completely different propagation impairments, due to travelling along different paths. The technique proposed by the present inventors improves upon such prior art techniques by taking into account the transmission paths of the channels through the optical transmission system. The present technique allows the efficient calculation of transmission power by the grouping together of channels having similar transmission paths, and determining a total transmission power for each group.

The step of allocating each channel to a group of channels may comprise allocating each channel to a group of channels having the same path through the optical transmission system.

The step of determining a quality metric for each group of channels may comprise determining a quality metric for each channel, and determining the quality metric for each group of channels in dependence upon the quality metric for each channel within the respective group.

The quality metric for each group of channels may correspond to an average of the quality metrics for each channel within the respective group.

The determined total transmission power for each group of channels may be inversely proportional to the quality metric of that group.

Said plurality of optical channels may comprise each channel added to the optical transmission system at a predetermined node in the optical transmission system.

The method may comprise: for each group of channels consisting of channels added at the node, determining if channels of the same wavelengths as the added channels have been dropped at said node; if channels of the same wavelengths have been dropped at the node, then determining a value indicative of a power of said dropped channels; and determining the total transmission power for each group of channels consisting of channels added at the node for which channels of the same wavelengths have been dropped at the node, in dependence upon the determined value indicative of the power of said dropped channels.

The total transmission power for each group of channels consisting of channels added at the node, for which channels of the same wavelengths have been dropped at the node, may be determined in dependence upon the difference between a power of said dropped channels and the express loss of said node.

The step of determining a total transmission power for each group may comprise: first determining the total transmission power for each group of channels consisting of channels added at the node, for which channels of the same wavelengths have been dropped at the node; and then determining a total transmission power for each remaining group of channels consisting of channels at the node for which channels of the same wavelength have not been dropped at the node.

The total transmission power may be determined for each remaining group of channels in dependence upon a predetermined power characteristic associated with said node.

An optical amplifier may be located adjacent an output of said node, and the total transmission power determined for each remaining group of channels in dependence upon an input power characteristic of said amplifier.

The method may comprise determining a transmission power for each channel.

The method may comprise transmitting each channel at the determined transmission power.

Said optical transmission system may comprise a plurality of nodes, and the method is repeated for each of said nodes.

A second aspect provides a data carrier carrying computer readable instructions for controlling a computer to carry out the above method.

A third aspect provides a computer apparatus comprising: a program memory storing processor readable instructions; and a processor configured to read and execute instructions stored in said program memory, wherein said processor readable instructions comprise instructions controlling the processor to carry out the above method.

A fourth aspect provides a node of an optical transmission system comprising: a processor configured to receive information indicative of the path through the optical transmission system of each channel added at the node, the processor being configured to: allocate each channel to a group of channels in dependence on the received information; determine a quality metric for each group of channels; and determine a total transmission power for each group in dependence upon the obtained information.

The processor may be further arranged to determine a transmission power for each channel.

The node may further comprise a transmitter arranged to transmit each channel at the determined transmission power.

The processor may be configured to receive the information indicative of the path from at least one of system management software, an optical supervisory channel, and the optical transmission system of each channel added at the node.

A fifth aspect provides an optical transmission system comprising a plurality of the above nodes.

DETAILED DESCRIPTION

Figure 1:
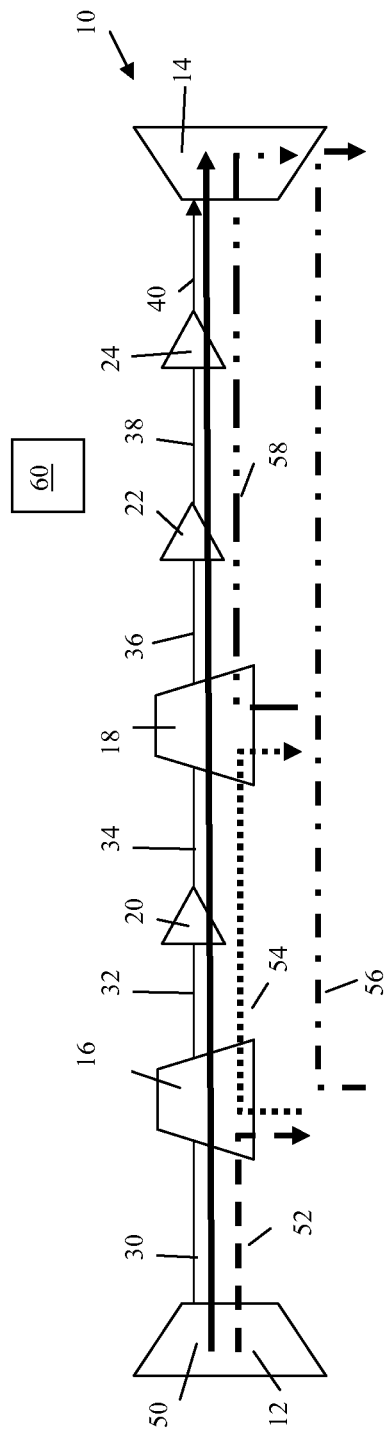
FIG. 1 is a schematic diagram of an optical transmission system in accordance with an example embodiment.

FIG. 1 is a schematic diagram of an optical transmission system 10 in accordance with an example embodiment. In this particular example, the optical transmission system 10 comprises four nodes 12, 14, 16, 18. Each node represents a network element at which optical signals (i.e. channels) can be added to, dropped from, or both added to and dropped from, the transmission system 10.

In this example, the transmission system 10 is a WDM system. The nodes consist of a transmitter 12 for transmitting channels, a receiver 14 for receiving channels, and two OADM (optical add-drop multiplexers) 16, 18. OADM nodes are network nodes at which channels can be dropped from the transmission system, and at which channels can be added to the transmission system. Each node 12, 14, 16,18 is connected to one or more adjacent nodes via optical waveguide 30, 32, 34, 36, 38, 40 e.g. optical fibre. Optical amplifiers 20, 22, 24 are located between widely separated nodes (or at least between nodes connected by relatively long spans of optical waveguide) to amplify the optical signals, and to offset the effects of attenuation of the signals by the optical waveguide.

In particular, a first span of optical fibre 30 (of length 20 km) connects the transmitter 12 to the first OADM 16. Two spans of optical waveguide 32, 34 (of respective lengths 60 km & 40 km) are connected in series, so as to connect the first OADM 16 to the second OADM 18. Located between the optical waveguide spans 32, 34 is a first optical amplifier 20. Three further spans of optical waveguide 36, 38, 40 (each of length 100 km) are connected in series, and connect the second OADM to the receiver 14. An optical amplifier 22 is located between the optical waveguide spans 36 & 38 and another optical amplifier 24 is located between the optical waveguide spans 38, 40.

Different groups of channels are transmitted along different paths within the transmission system 10. Each arrowed line 50, 52, 54, 56, 58 represents a path of a group of channels (i.e. a group of signals of different wavelengths). Thus, a first group of channels 50 is transmitted from the transmitter 12 to the receiver 14. A second group of channels 52 is transmitted from the transmitter 12 to the first OADM 16. A third group of channels 54 is transmitted from the first OADM 16 to the second OADM 18, whilst a fourth group of channels 56 is transmitted from the first OADM 16 to the receiver 14. A fifth group of channels 58 is transmitted from the second OADM 18 to the receiver 14.

The optical transmission system 10 further comprises at least one computer apparatus 60 for determining transmission power of the channels in accordance with an example embodiment. Each node may comprise a computer apparatus 60 for determining the transmission power of the optical channels added at that node. Alternatively, the transmission system 10 can comprise one or more computer apparatus 60, each arranged to determine the transmission power of optical channels added to the system at a plurality of nodes.

Each computer apparatus 60 comprises a program memory storing processor readable instructions, and a process configured to read and execute instructions stored in the program memory. The computer apparatus also comprises a data carrier carrying computer readable instructions, for loading the instructions into program memory.

The present inventors have appreciated that conventional pre-emphasis techniques are based on the underlying assumption that the channels are transmitted along point-to-point links, with all channels being entered onto the optical transmission system at the same node, and then also terminated at a common node.

However, optical transmission systems in which different channels (or groups of channels) are transmitted along different paths (i.e. in multi-path optical transmission systems, including optical networks) can result in different channels/groups of channels experiencing substantially different transmission conditions. For example, the first group of channels 50 illustrated in FIG. 1 will generally perform much worse than the second channel group 52, due to the big difference in transmission distance e.g. the first channel group 50 is transmitted along an optical waveguide of length 420 km, whilst the second channel group 52 is only transmitted along 20 km of optical waveguide. Thus, the difference in the BER of the different groups can be too large to be compensated for using conventional pre-emphasis techniques.

Another issue is that many network nodes (e.g. OADM nodes) will contain booster optical amplifiers to boost the optical signal (i.e. the power of the different optical channels) being transmitted from that node. For example, the OADM 16 in FIG. 1 contains a booster amplifier. It is desirable to ensure the signals input to the booster amplifier are within a predetermined power range. It will be seen that the OADM 16 is associated with the transmission of three groups of channels (50, 54 & 56). Thus, adjusting the power of any one of these groups (e.g. adjusting the power of the first group 50 transmitted from transmitter 12) could potentially disturb the performance of the other two groups (e.g. groups 54 & 56, both of which are added at the first OADM 16), potentially leading to a network instability.

To mitigate such problems, the apparatus 60 is arranged to determine transmission power in accordance with an embodiment.

In particular, the apparatus 60 is arranged to allocate a total transmission power for each group of channels that passes along a similar path (normally, an identical path) within the optical transmission system. Preferably, each group of channels is normally of the same type i.e. relates to channels being transmitted at the same transmission rate e.g. channels transmitted at 40 Gb/s will preferably be allocated to a different group than channels transmitted at 10 Gb/s.

The power is allocated between groups based upon a group quality metric i.e. an indication of the performance of the group. The group quality metric can be determined based upon any one or more factors that is indicative of, or related to, the performance of the channels within that group.

For example, in a relatively simple case, the metric for each group can be based upon the length of the light path experienced by the group i.e. the length of optical waveguide along which the group of channels travels. Such a simplistic metric is not entirely accurate, as the performance of the channel is not trivially correlated to the light path length e.g. a 150 km single span link typically performs worse than a 400 km link composed of 5 spans of 80 km, because the OSNR would typically be better in the second case.

An alternative is to determine a quality metric of the channels within the group, and to determine the group quality metric based upon the quality metric of the individual channels within that group. For example, a quality metric of each group can be based upon the average quality metric of each channel within the group. Alternatively, the group quality metric can take into account the statistical distribution of the values of the quality metric of every channel within the group e.g. the group quality metric can be a function of the mean, mode, median and/or standard deviation of the quality metrics of each channel within the group.

The relevant channel quality metric can be measured from the system, or can be calculated based upon theoretical considerations. A suitable quality metric that is relatively easy to calculate, is the OSNR (Optical Signal to Noise Ratio) of each channel. However, more preferable is to use the Q (Quality) factor of each channel to calculate the group quality factor, as the Q factor takes into account all of the propagation effects on the channels. Further, the Q factor of each channel is normally estimated during the network planning operation, and hence is generally readily available. An alternative to the Q factor would be to use the BER (Bit Error Rate) e.g. the pre-FEC (forward error corrected) BER. As for instance indicated within U.S. Ser. No. 11/572,549, the Q factor is a monotonic decreasing function of the Q factor.

Thus, as the total transmission power of a group is allocated, the total power input to booster amplifiers in transmitter terminals or OADM nodes will remain constant. Conventional pre-emphasis techniques can then be utilised to allocate the individual channel powers within each group of channels i.e. to divide up the total transmission power of a group into the separate channel powers.

A more detailed description of a method of determining transmission power will now be described with reference to FIGS. 2, 3A & 3B, in accordance with an embodiment.

The method steps can be performed in respect of any node within the optical transmission system 10. FIG. 2 shows the generalised method steps. Most preferably, the method 100 is performed iteratively in respect of each node in the system 10.

The optical system 10 includes appropriate apparatus (e.g. means) to perform each of the method steps for at least one node, and preferably for every node. For example, each node can include the appropriate apparatus or means to perform the method steps for that node. Alternatively the system 10 can contain one or more apparatus, each arranged to perform the method steps for a plurality of nodes.

Within the method 100, the path of each channel added at the relevant node is determined (step 110). Information on the path of each channel can be obtained from or determined via any one or more of a number of sources. For example, the information can be obtained from the system management software that manages the optical transmission system. Alternatively, the information could be obtained via an optical supervisory channel i.e. an optical channel that is transmitted within the network to provide control information/commands, i.e. the optical supervisory channel typically transmits management data for the optical transmission system. Path information could also be obtained or determined from other sources e.g. by monitoring of the information contained within the optical channels, or monitoring of the network elements which transmit the different optical channels e.g. the optical transmission system of each channel.

In this example, the group quality metric is calculated based upon the quality metric of each channel within the respective group, and therefore the quality metric of each of the channels added at the node is also determined (120). For example, the Q factor, as estimated by the tool used for network design and planning, is obtained.

Based upon the determined path information, each channel added at that node is allocated to a group (step 130), so that channels of each group experience a similar path through the optical transmission system 10. Thus a number of groups of channels are formed, each group corresponding to a different light path. Typically, each channel will be allocated to a group corresponding to a particular path through the optical transmission system i.e. such that each channel within a group experiences an identical path through the optical transmission system. For example, five groups of channels (50, 52, 54, 56 & 58) were described with reference to FIG. 1, with each channel in any given group experiencing the same path as other channels within that group.

Whilst for accuracy of calculation it is generally preferable that each channel within a group experiences an identical path, each group could correspond to a different, generalised path within predetermined criteria, rather than a particular path, such that channels within each group experience paths (albeit ones that differ slightly within predetermined limit/criteria) through the optical transmission system.

The group quality metric is calculated for each group (step 140). For example, if the Q factor as the individual channel quality metric, then the group quality metric can be the average Q factor of each channel within that group.

Once the group quality metric has been calculated for each group (step 140), then a total power is allocated to each group, based upon the group quality metrics. Such allocation of power can be performed in accordance with any predetermined power allocation scheme. For example, groups having a quality metric that indicates a relatively high quality of transmission (e.g. a low OSNR or BER) can be allocated a lower total power than groups having a group quality metric indicating poorer transmission capabilities. Thus, the power can be allocated to the different groups of channels based upon predetermined criteria, so as to optimise the total network transmission capability. An example power allocation method is described below with reference to FIGS. 3A & 3B.

The total power allocated to each group corresponds to the total optical power for allocation across all of the channels within that group. Once the total power has been allocated to each group (step 150), then a conventional power allocation scheme can be followed to allocate an individual power to each channel within a group (step 160). Thus, the total power group power can be divided up into individual channel powers for the channels within each group. For example, once the total group power has been allocated, that group of channels can subsequently be treated as a point-to-point link, and conventional pre-emphasis techniques can be used to calculate the individual channel powers based upon the total power allocated to that group. An example of such a scheme is described within U.S. Ser. No. 11/572,549, although various alternatives will be known to the skilled person.

Once the power has been allocated to each channel within a group, then those channels are transmitted at the allocated power (170) i.e. the channels are transmitted by the transmitter at the allocated power, or added at the OADM at the allocated power (step 170). The channels can continue to be transmitted at the relevant allocated powers (step 170) until a change in transmission path (step 180) is detected on one or more of the channels added at the node, in which case the method is repeated (i.e. the method returns to step 110). In the below method described with respect to FIGS. 3A & 3B for allocation of group power, the allocation of group power will also depend upon the channels being dropped at the node, and hence in such circumstances, a change in transmission path (step 180) of channels dropped at the node should also require that the power allocation method is performed again.

Figure 3A:
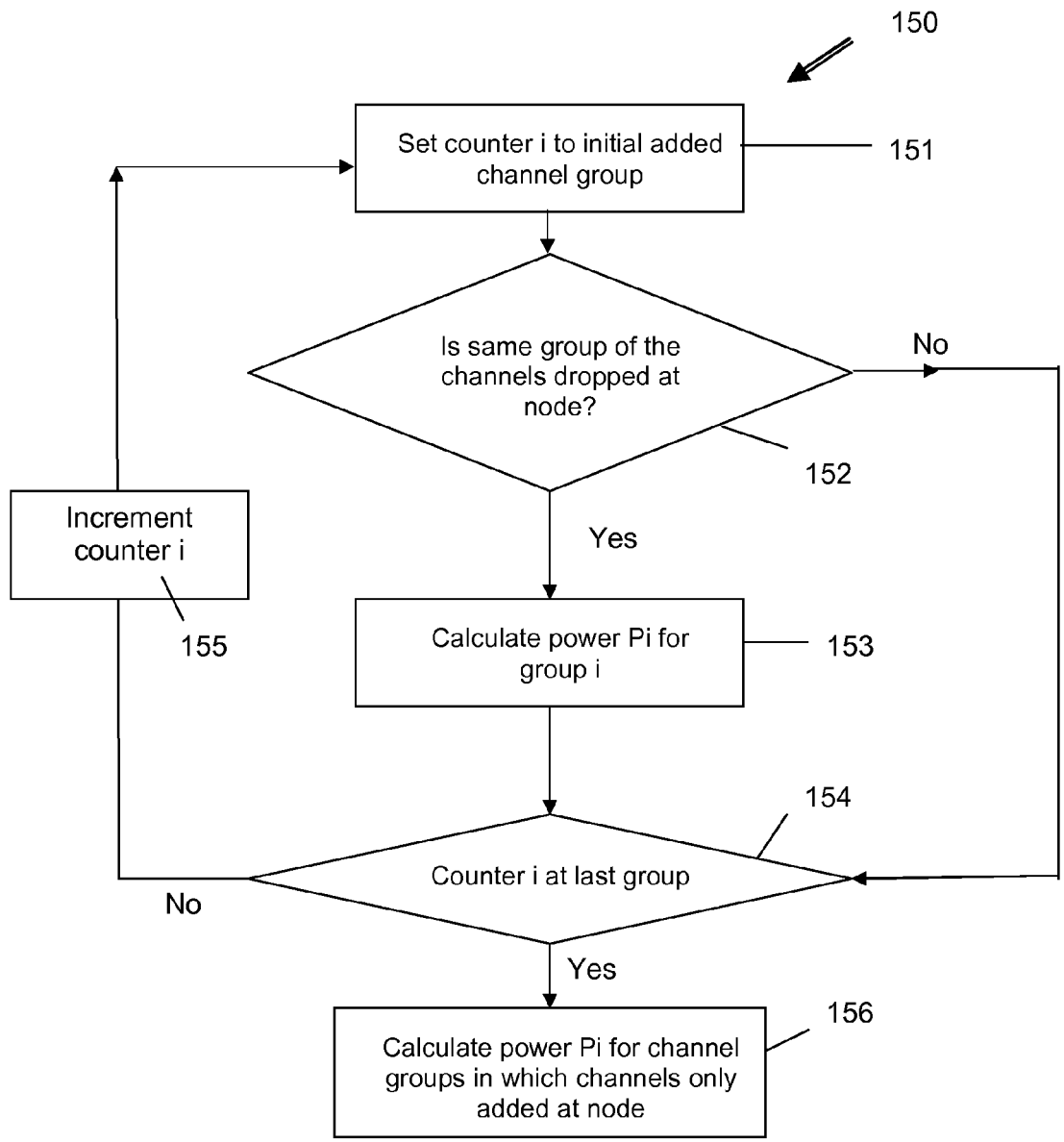
FIG. 3A is a flow chart illustrating an implementation of method step 150 from FIG. 2 in accordance with an example embodiment.

FIG. 3A indicates the method steps involved in allocating a total power to each group (step 150), in accordance with a particular embodiment. Alternative power allocation methods may be apparent to the skilled person based on the teachings herein.

The power allocation steps shown in FIG. 3A provide a convenient and effective way of allocating power to the groups of channels added at the node.

Figure 3B:
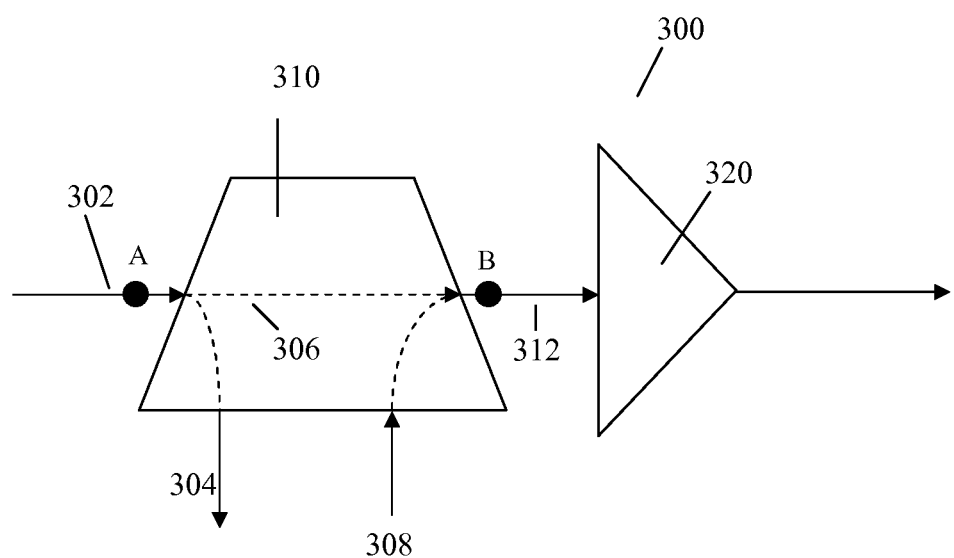
FIG. 3B is a schematic diagram of a network node in accordance with an example embodiment for use in explaining the allocation of group channel power of the method steps of FIG. 3A.

FIG. 3B illustrates a general node 300 of an optical transmission system, in which channels are added to the system in accordance with an example embodiment. The node is an OADM node, and comprises both the OADM multiplexer 310, and an associated booster amplifier 320 arranged to boost the power of signals output from the multiplexer 310. An input 302 receives channels from elsewhere in the optical transmission system. At point A, immediately prior to entering the OADM, the channels on the input consist of both the channels to be dropped at that node, and the channels to be passed through that node.

Within the multiplexer 310, the channels received at input 302 are split into two-channels for onward transmission (which are arranged to pass through the multiplexer along path 306) and channels to be dropped at the node (which are passed to drop output 304).

The node 300 is an OADM, and hence channels can also be added at the node. Channels to be added at the node are provided to add input 308, with those channels being subsequently multiplexed with the channels passed through the node along pass path 306, such that the combined output channels from the node will be provided on multiplexer output 312. The output 312 is connected the booster amplifier 320, for amplifying the optical signals prior to transmission of the optical signals along the adjacent span of optical waveguide, towards the next node. The amplifier 320 will typically have a preferred input power, so as to ensure optimum amplifier performance such a preferred input power is often referred to as the "nominal input power". Thus, it is preferable that the total power of all the channels at point B (i.e. on the output 312 of the multiplexer 310) is at a predetermined level, so as to ensure optical amplifier performance. The method steps as described with reference to FIG. 3A for group power allocation ensure that the power at point B is at the optimal level as well as allocate the group channel power using a methodology that provides network stability.

Within the method steps shown in FIG. 3A, it is assumed that the channels have been allocated to M different groups, with each group having an associated quality metric $Q_i$ (e.g. an associated Q-factor), where $i=1, 2, \ldots, M$. Thus M groups of channels are assumed to have been added at the relevant node.

For each group of channels, the total power is allocated to the group using the equation:

$$P_i = C_i \frac{1/Q_i}{\sum_{i=1}^{M} 1/Q_i}$$

Where M is the number of groups composed of channels added at the relevant node, and $C_i$ is the normalisation power constant appropriate for that group.

The constant $C_i$ will vary between two forms, depending upon whether the groups being added at the node (i.e. the channels being added at input 308) correspond to the wavelengths of the channels being dropped at the node (i.e. sent to drop output 304), or not.

For each group of channels being added at the node, a check is made to see whether channels of corresponding wavelength are dropped at that node (step 152). The first form of constant $C_i$ is for an added channel group, in which all of the channels being added correspond to wavelengths of channels dropped at that node, and can be calculated using the expression: $C_i$=power of dropped wavelengths at point A (e.g. at the OADM input 302)—OADM express loss (e.g. the attenuation of the OADM 310 along internal path 306). For convenience, the first form of constant $C_i$ will typically be expressed as a gain e.g. in decibel units (dB).

For each group of channels being added in which the added channels correspond to wavelengths being dropped, the total power for that group is calculated using the above equation for $P_i$, and the above normalisation power constant $C_i$ expressed in decibel units. The steps 151, 153, 154 & 155 within FIG. 3A simply ensure that the power allocation is carried out for all of the groups of channels added at the node for which corresponding channels/wavelengths have been dropped at that node.

For each group of channels that consists of channels for which every channel group does not have a corresponding wavelength/channel dropped at that node, a different, second form of normalisation power constant $C_i$ is utilised. In particular, the second form of the normalisation power constant utilised is $C_i$=nominal input power of amplifier (e.g. preferred channel input power of boost amplifier at point B)—pre-allocated channel powers.

The pre-allocated channel powers include both the channel powers of the channels that have passed through the multiplexer (i.e. those channels that were received on input through to, but not dropped, and pass along path 306) and the powers of channels of the channel groups that were added that correspond to wavelengths of drop channels (e.g. the group channel powers calculated using the first form of $C_i$).

For convenience, the second form of the normalisation power $C_i$ here is normally calculated in units of power e.g. in watts i.e. based upon the actual powers of the normal input power and the sum of the remaining powers, also expressed in watts. Thus, this value of $C_i$ expressed in watts is calculated as part of step 156, and then the power $P_i$ for each of those relevant groups of channels calculated (step 156) such that the total power of each group of channels is calculated.

Figure 2:
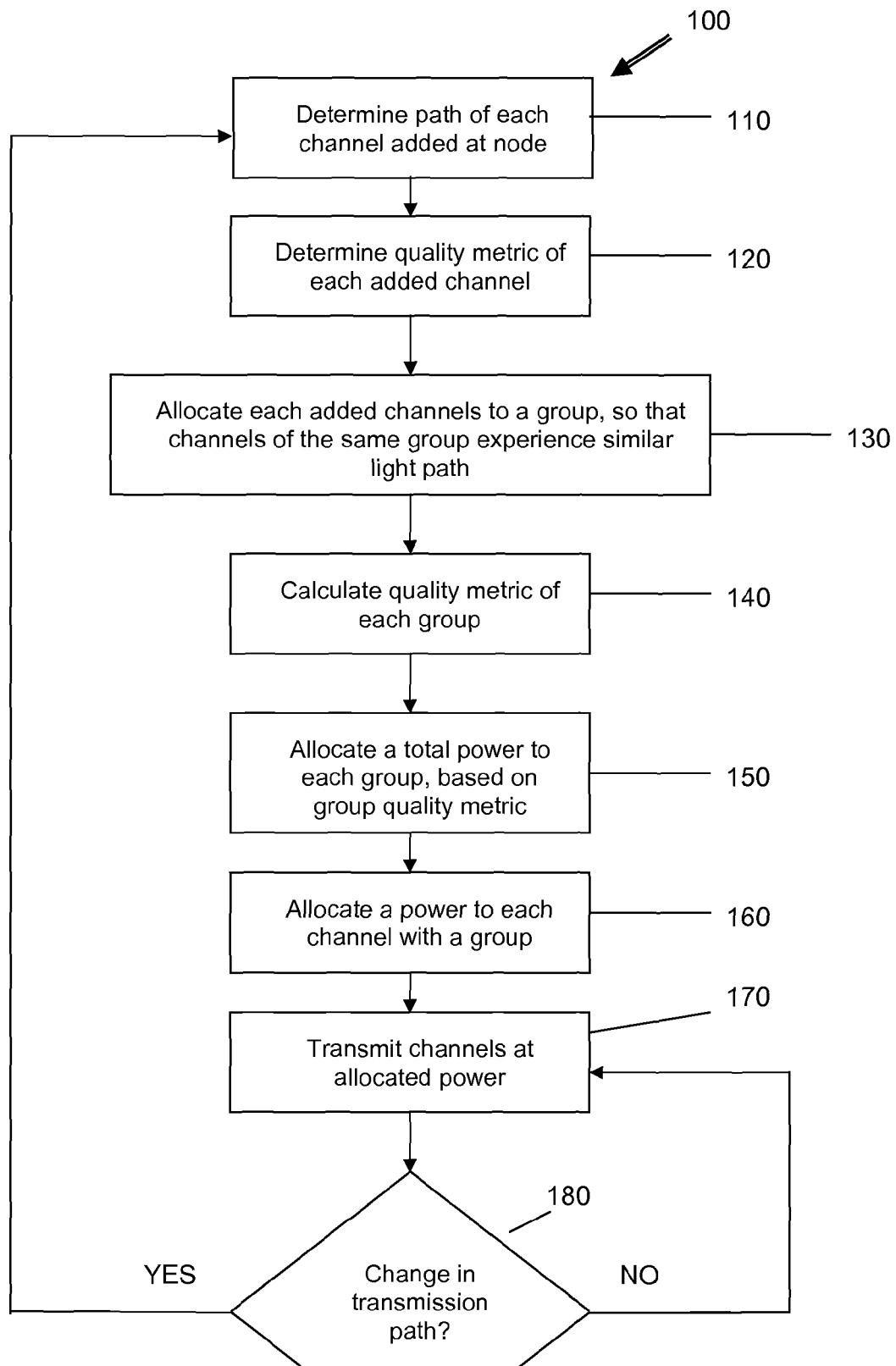
FIG. 2 is a flow chart illustrating a method in accordance with an example embodiment.

As indicated earlier with respect to FIG. 2, once the total power for each group has been calculated, then for each group, the individual channel powers can be calculated using conventional pre-emphasis or other power allocation methods (step 160).

Experimental results have shown that such a power allocation scheme is effective in allocating powers in multi-path optical transmission systems.

Figure 4:
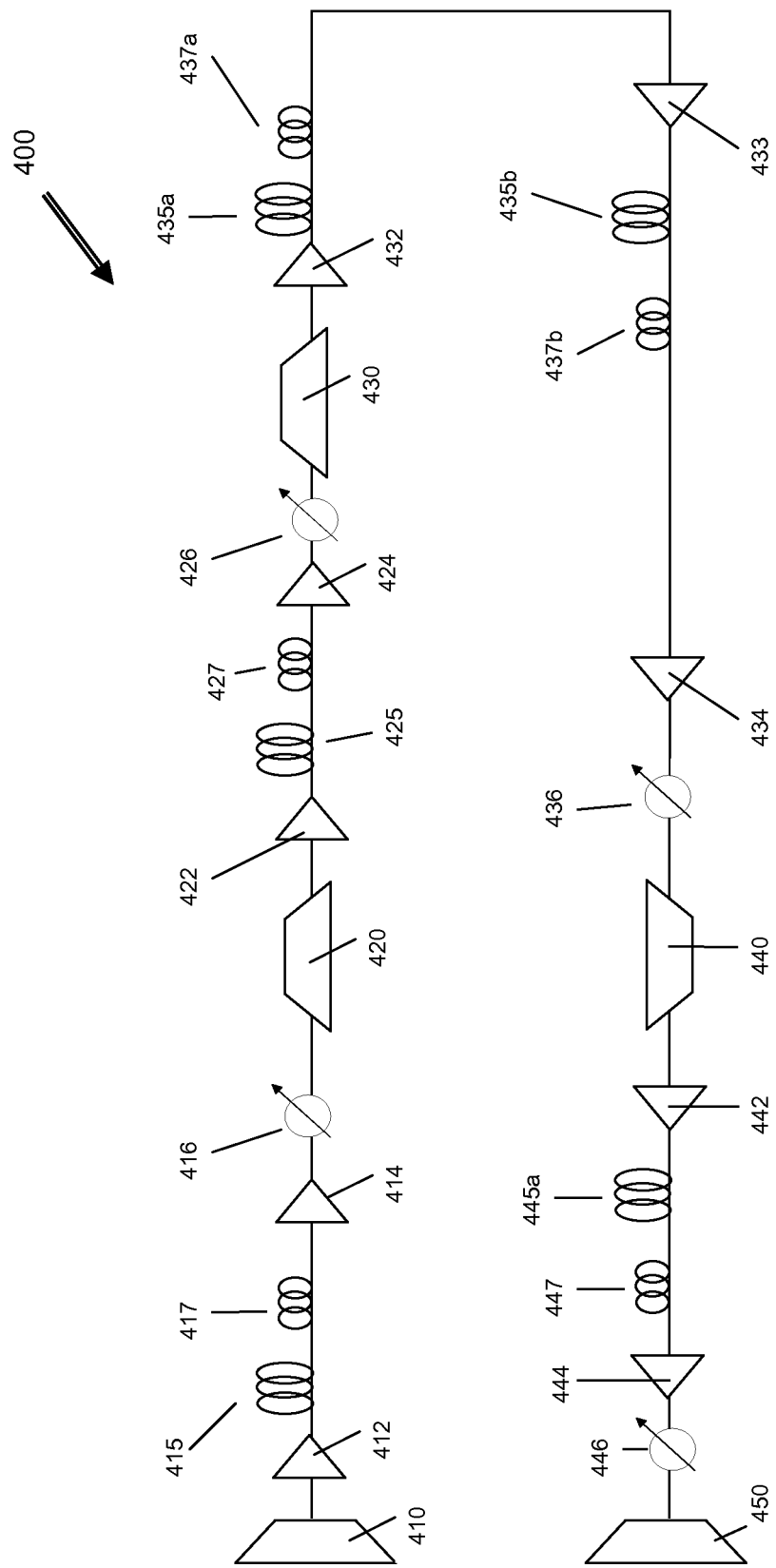
FIG. 4 is a schematic diagram of an optical transmission system used in experiments to verify implementation of an example embodiment.

FIG. 4 shows an optical transmission system 400 in a first configuration, as used to verify the effectiveness of the above-referenced method described with reference to FIGS. 1-3B.

The system 400 comprises a transmitter 410, a receiver 450, and three intermediate OADM nodes 420, 430 & 440 connected in series between the transmitter 410 and the receiver 450. The output of each node (i.e. transmitter 410 and OADMs 420, 430 & 440) are connected to a respective booster amplifier 412, 422, 432 & 442. Located adjacent each of the input of the receiving nodes (i.e. OADMs 420, 430, 440 & receiver 450) is a respective variable optical attenuator (VOA) 416, 426, 436 & 446. Different configurations of the system 400 were used for different experiments as will be indicated below.

In a first configuration, the transmitter 410 is arranged to transmit channels to the first OADM 420 via 80 km of G652 specification optical fibre (415) and a dispersion compensating module 417 comprising dispersion compensating fibre having a performance of −1360 ps/nm, and a power amplifier 414. G652 fibre is optical fiber that conforms to the ITU-T G.652 recommendation of the International Telecommunication Union (ITU).

First OADM 420 is connected to second OADM 430 via a further span (425) comprising 80 km in length of G652 fibre, a dispersion compensating module comprising dispersion compensating fibre having a performance of −1360 ps/nm, and a further power amplifier 424.

The second OADM 430 is connected to the third OADM via two spans of transmission fibre (435a, 435b), each of length 80 km, and of standard G652. A dispersion compensating module 437a comprising dispersion compensating fibre having a performance of −1360 ps/nm is associated with the first span 435a of transmission fibre, and a further dispersion compensating module consisting of dispersion compensating fibre having a transmission characteristic of −1374 ps/nm is associated with the second span of transmission fibre 435b. An optical amplifier 433 is located between the first DCM 437a and second span of transmission fibre 435b and a further optical amplifier 434 located between the second dispersion compensating module 437b and the VOA 436 located adjacent the input to the third OADM 440.

The third OADM 440 is connected to the receiver 450 by an 80 km span of transmission fibre 445 of standard G652, with an associated dispersion compensating module 447 of dispersion compensating fibre having a characteristic of −1393 ps/nm, and a power amplifier 444.

In each of the experiments, a total of 16 channels were transmitted along respective paths in the transmission system 400. The channels were transmitted at 10 Gb/s.

A first group of channels (corresponding to light paths 1-4 in FIGS. 5-8) was transmitted from the transmitter 410 to the first OADM 420.

A second group of channels (light paths 5-8) was transmitted from the transmitter 410 along the 4 optical transmission system to the receiver 450 i.e. via each of the OADMs 420, 430 & 440.

A third group of channels (light paths 9-12) was transmitted from the first OADM 420 to the third OADM 440, whilst the fourth group of channels (light paths 13-16) was transmitted from the second OADM 430 to the receiver 450.

Thus, each group of channels experiences a different light path and travels a different number of spans.

Figure 5:
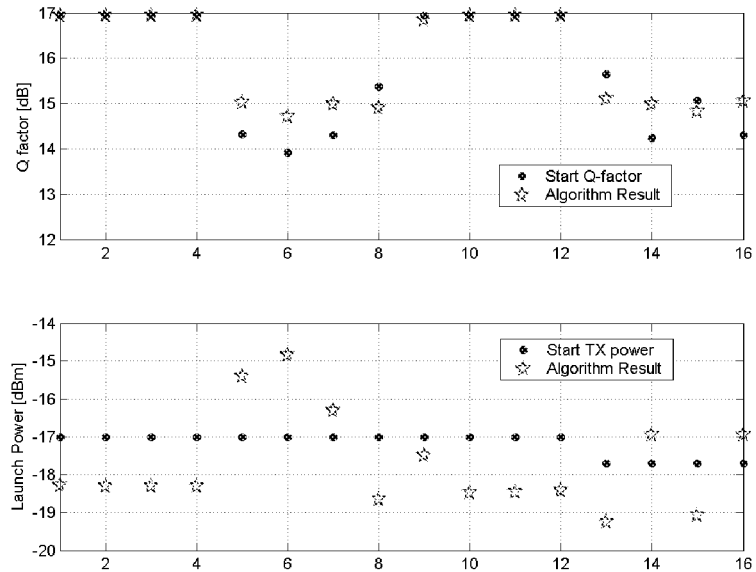
FIGS. 5-8 are graphs of experimental results illustrating the change in Q (Quality) factor and transmission power following use of a method in accordance with an example embodiment, with each figure corresponding to experimental results from a different configuration of the apparatus of FIG. 4.

FIG. 5 shows the results of applying an embodiment to allocate the powers to the channels using the optical transmission system of FIG. 4.

FIG. 5 shows two graphs. The upper graph indicates the Q factor corresponding to each channel (labelled by light path number), whilst the second, lower graph indicates the launch power (dBm) of each channel. Within each graph, the initial values (i.e. of Q-factor and of launch power) are shown prior to utilisation of the described technology and then the subsequent values obtained by applying the described technology to allocate the group powers. In particular examples shown, the quality metric used to calculate the powers was the average Q-factor for each group as calculated from the pre-FEC BER values for each channel. The initial values are indicated by a dot, and the results of allocating channel power in accordance with an embodiment by a star. In each instance it will be seen that the launch power (i.e. the power at which each individual channel is transmitted) has been altered following application of an embodiment, leading to a subsequent improvement in the Q-factor of each channel. For example, prior to application of an embodiment, the initial Q-factor spread within channels 5-8 was 1.5 dB, whilst the final spread is 0.4 dB.

Figure 6:
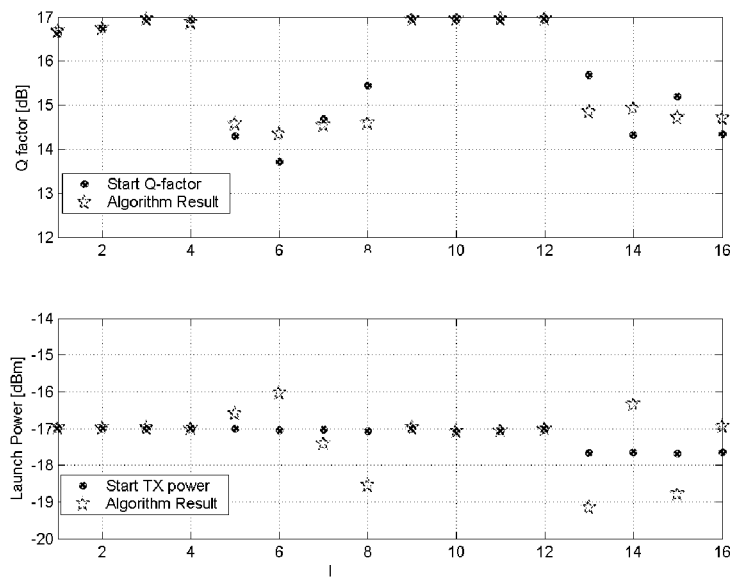

FIG. 6 shows the same results as FIG. 5, but with a slightly different equipment configuration. In particular, the dispersion compensating module 417 was changed from having a characteristic of −1360 ps/nm to having a characteristic of −300 ps/nm. Once again the maximum Q-factor spread within the group of channels has decreased in this instance from 1.7 dB to 0.4 dB.

Figure 7:
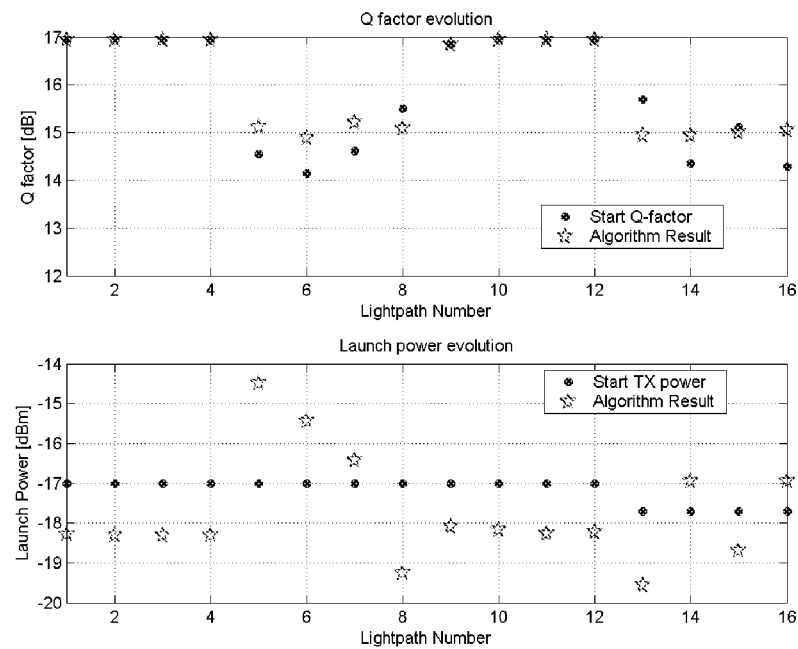

For the experimental set up for FIG. 7, the system shown in FIG. 4 was changed by removing the DCM 417, and replacing it with a further 80 km of G655 optical fibre.

Figure 8:
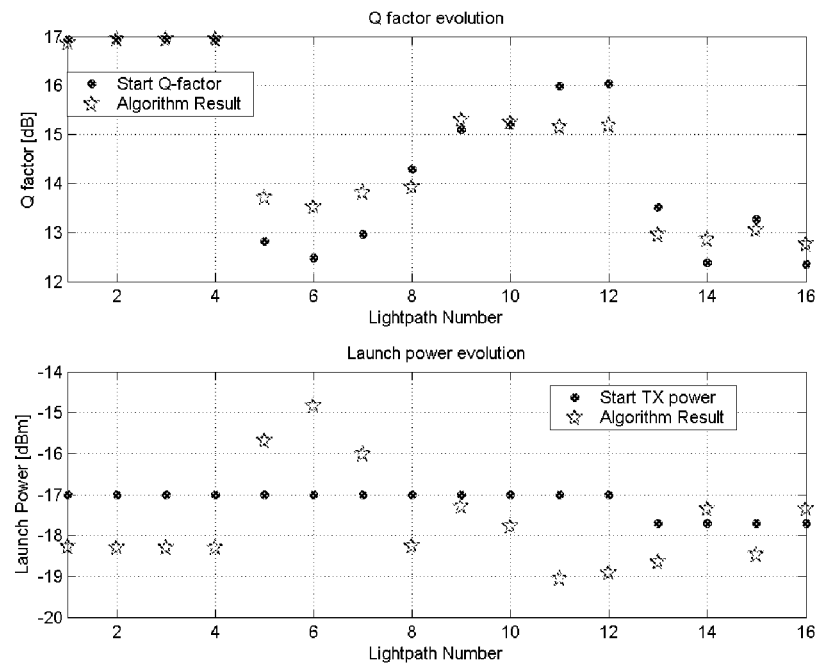

In the experimental apparatus used to obtain the results shown in FIG. 8, the same experimental set up was used as that described above for FIG. 7 but with an additional variable optical attenuator placed in the transmission path in front of the optical pre-amplifier 434, in order to degrade the OSNR of the second, third and fourth groups (i.e. light paths 5-16). The OSNR degradation was greater than 2 dB. Again, FIGS. 7 and 8 show that application of an embodiment to those systems significantly reduces the maximum Q-factor spread.

Based upon the teachings herein, various alternatives will be apparent to the skilled person as falling within the scope of the claims.

The invention claimed is:

1. A method of determining transmission power of a plurality of optical channels for transmission of said optical channels along different respective paths through an optical transmission system, the method comprising:
   obtaining information indicative of the path of each optical channel through the optical transmission system, where at least two optical channels have different paths through the optical transmission system;
   allocating each optical channel to one of multiple different groups of optical channels in dependence upon the obtained information;
   determining a quality metric for each group of optical channels;
   wherein the step of determining a quality metric for each group of optical channels comprises:
   determining a quality metric for each optical channel; and
   determining the quality metric for each group of optical channels in dependence upon the quality metric for each optical channel within the respective group; and
   determining a total transmission power for each group in dependence upon the determined quality metric.

2. A method as claimed in claim 1, wherein the step of allocating each optical channel to a group of optical channels comprises:
   allocating each optical channel to a group of optical channels having the same path through the optical transmission system.

3. A method as claimed in claim 1, wherein the quality metric for each group of optical channels corresponds to an average of the quality metrics for each optical channel within the respective group.

4. A method as claimed in claim 1, wherein the determined total transmission power for each group of optical channels is inversely proportional to the quality metric of that group.

5. A method as claimed in claim 1, wherein said plurality of optical channels comprises each optical channel added to the optical transmission system at a predetermined node in the optical transmission system.

6. A method as claimed in claim 5, wherein the method comprises:
   for each group of optical channels consisting of optical channels added at the node, determining if optical channels of the same wavelengths as the added optical channels have been dropped at said node;
   if optical channels of the same wavelengths have been dropped at the node, then determining a value indicative of a power of said dropped optical channels; and
   determining the total transmission power for each group of optical channels consisting of optical channels added at the node for which optical channels of the same wavelengths have been dropped at the node, in dependence upon the determined value indicative of the power of said dropped optical channels.

7. A method as claimed in claim 6, wherein the total transmission power for each group of optical channels consisting of optical channels added at the node, for which optical channels of the same wavelengths have been dropped at the node, is determined in dependence upon the difference between a power of said dropped optical channels and the express loss of said node.

8. A method as claimed in claim 5, wherein the step of determining a total transmission power for each group comprises:
   first determining the total transmission power for each group of optical channels consisting of optical channels added at the node, for which optical channels of the same wavelengths have been dropped at the node; and
   then determining a total transmission power for each remaining group of optical channels consisting of optical channels at the node for which optical channels of the same wavelength have not been dropped at the node.

9. A method as claimed in claim 8, wherein the total transmission power is determined for each remaining group of optical channels in dependence upon a predetermined power characteristic associated with said node.

10. A method as claimed in claim 9, wherein an optical amplifier is located adjacent an output of said node, and the total transmission power is determined for each remaining group of optical channels in dependence upon an input power characteristic of said amplifier.

11. A method as claimed in claim 1, comprising:
    determining a transmission power for each optical channel.

12. A method as claimed in claim 11, comprising:
    transmitting each optical channel at the determined transmission power.

13. A method as claimed in claim 5, wherein said optical transmission system comprises a plurality of nodes, and the method is repeated for each of said nodes.

14. A computer readable storage medium storing programmable instructions for controlling a computer to determine transmission power of a plurality of optical channels for transmission of said optical channels along different respective paths through an optical transmission system, by carrying out the programmable instructions to perform the steps of:
    obtaining information indicative of the path of each optical channel through the optical transmission system, where at least two optical channels have different paths through the optical transmission system;
    allocating each optical channel to one of multiple different groups of optical channels in dependence upon the obtained information;
    determining a quality metric for each group of optical channels;
    wherein the step of determining a quality metric for each group of optical channels comprises:
    determining a quality metric for each optical channel; and
    determining the quality metric for each group of optical channels in dependence upon the quality metric for each optical channel within the respective group; and
    determining a total transmission power for each group in dependence upon the determined quality metric.

15. A computer apparatus comprising:
    a program memory storing processor readable programmable instructions; and a processor configured to read and execute the programmable instructions stored in said program memory;

wherein said processor readable programmable instructions comprise instructions controlling the processor to determine transmission power of a plurality of optical channels for transmission of said optical channels along different respective paths through an optical transmission system, by performing the steps of:

obtaining information indicative of the path of each optical channel through the optical transmission system, where at least two optical channels have different paths through the optical transmission system;

allocating each optical channel to one of multiple different groups of optical channels in dependence upon the obtained information;

determining a quality metric for each group of optical channels;

wherein the step of determining a quality metric for each group of optical channels comprises:

determining a quality metric for each optical channel; and determining the quality metric for each group of optical channels in dependence upon the quality metric for each optical channel within the respective group; and determining a total transmission power for each group in dependence upon the determined quality metric.

16. A node of an optical transmission system comprising:

a processor configured to receive information indicative of the path through the optical transmission system of each optical channel added at the node, where at least two optical channels added at the node have different paths throught the optical transmission system, the processor being configured to:

allocate each optical channel to one of multiple different groups of optical channels in dependence on the received information;

determine a quality metric for each group of optical channels;

wherein the step of determining a quality metric for each group of optical channels comprises:

determining a quality metric for each optical channel; and determining the quality metric for each group of optical channels in dependence upon the quality metric for each optical channel within the respective group; and determine a total transmission power for each group in dependence upon the obtained information.

17. A node as claimed in claim 16, wherein said processor is further arranged to determine a transmission power for each optical channel.

18. A node as claimed in claim 17, further comprising a transmitter arranged to transmit each optical channel at the determined transmission power.

19. A node as claimed in claim 16, wherein said processor is configured to receive the information indicative of the path from at least one of system management software, an optical supervisory channel, and the optical transmission system of each optical channel added at the node.

20. An optical transmission system comprising a plurality of nodes, each node comprising:

a processor configured to receive information indicative of the path through the optical transmission system of each optical channel added at the node, where at least two optical channels added at the node have different paths throught the optical transmission system, the processor being configured to:

allocate each optical channel to one of multiple different groups of optical channels in dependence on the received information;

determine a quality metric for each group of optical channels;

wherein the step of determining a quality metric for each group of optical channels comprises:

determining a quality metric for each optical channel; and determining the quality metric for each group of optical channels in dependence upon the quality metric for each optical channel within the respective group; and determine a total transmission power for each group in dependence upon the obtained information.

* * * * *

UNITED STATES PATENT AND TRADEMARK OFFICE
CERTIFICATE OF CORRECTION

| | | |
|---|---|---|
| PATENT NO. | : 8,457,491 B2 | Page 1 of 1 |
| APPLICATION NO. | : 12/741721 | |
| DATED | : June 4, 2013 | |
| INVENTOR(S) | : Ciaramella et al. | |

It is certified that error appears in the above-identified patent and that said Letters Patent is hereby corrected as shown below:

In the Claims

In Column 13, Line 31, in Claim 16, delete "throught" and insert -- through --, therefor.

In Column 14, Line 24, in Claim 20, delete "throught" and insert -- through --, therefor.

Signed and Sealed this
Fifth Day of November, 2013

Teresa Stanek Rea
*Deputy Director of the United States Patent and Trademark Office*